United States Patent [19]
Kelz et al.

[11] Patent Number: 5,647,534
[45] Date of Patent: Jul. 15, 1997

[54] DEVICE FOR HEATING AN INTERIOR OF AN ELECTRIC VEHICLE

[75] Inventors: Michael Kelz, Aidlingen; Wolfgang Odebrecht, Sindelfingen, both of Germany

[73] Assignee: Mercedes-Benz AG, Germany

[21] Appl. No.: 532,460

[22] Filed: Sep. 22, 1995

[30] Foreign Application Priority Data

Sep. 22, 1994 [DE] Germany .......................... 44 33 836.8

[51] Int. Cl.$^6$ ........................................ B60H 1/04
[52] U.S. Cl. .................... 237/12.3 B; 165/80.4; 165/43; 180/65.8; 429/120
[58] Field of Search ............. 237/12.3 B, 12.3 A; 165/42, 43, 80.4; 180/65.1, 65.8; 429/120

[56] References Cited

U.S. PATENT DOCUMENTS

| | | | |
|---|---|---|---|
| 4,007,315 | 2/1977 | Brinkmann et al. | 429/120 |
| 4,415,847 | 11/1983 | Galloway | 320/2 |
| 4,532,894 | 8/1985 | Wulf et al. | 123/142.5 E |
| 5,407,130 | 4/1995 | Uyeki et al. | 237/12.3 B |
| 5,432,026 | 7/1995 | Sahm et al. | 429/120 |
| 5,481,433 | 1/1996 | Carter | 361/690 |
| 5,490,572 | 2/1996 | Tajiri et al. | 180/65.1 |
| 5,537,956 | 7/1996 | Rennfeld et al. | 123/41.29 |

FOREIGN PATENT DOCUMENTS

| | | |
|---|---|---|
| 26 38 862 | 3/1978 | Germany . |
| 42 26 781 | 2/1993 | Germany . |
| WO94/11212 | 5/1994 | WIPO ................... 165/42 |

*Primary Examiner*—William E. Tapolcai
*Attorney, Agent, or Firm*—Evenson, McKeown, Edwards & Lenahan P.L.L.C.

[57] ABSTRACT

The invention relates to a device for heating the interior of an electric vehicle having an air-cooled high-temperature battery. Waste heat form the battery is supplied to the interior via a liquid circuit having a heat exchanger which can be controllably bombarded by the waste air from the battery and by fresh air. The liquid circuit is also connected to and cools heat-generating components of the electric drive system.

6 Claims, 2 Drawing Sheets

5,647,534

DEVICE FOR HEATING AN INTERIOR OF AN ELECTRIC VEHICLE

BACKGROUND AND SUMMARY OF THE INVENTION

The invention relates to a device for heating an interior of an electric vehicle by using the waste heat from an air-cooled high-temperature battery.

From German Offenlegungsschrift 26 38 862, it is known in electric vehicles to employ the lead battery also as a heat accumulator. Prior to commencement of the journey, the battery block heats up to an elevated temperature and the stored heat energy is used to heat the vehicle during running. The heat of the battery block can be evacuated by a liquid circuit or by air-cooling of the battery.

Due to their relatively high energy density, so-called "high-temperature batteries" are preferred for planned electric vehicles. Depending on the operating conditions, such batteries must be more or less heavily cooled. In this context, it is known from DE 42 26 781 A1 to provide in the vehicle a heat-carrier circuit with a liquid heat-carrier medium. This arrangement absorbs the waste heat from both the electric drive system and the high-temperature battery, which is linked via a fluid circuit with heat exchanger to the heat-carrier circuit. The waste heat thus absorbed is evacuated via a heat exchanger which is usable as a heating element for the vehicle interior, to the air of the vehicle interior.

One object of the invention is to enable the high-temperature battery of a vehicle to be air-cooled in a manner which is simple and relatively highly reliable. Another object of the invention is to ensure that, in making use of the heat of the air emanating from the battery, a sufficient reduction in temperature is achieved relative to the (in some circumstances) high operating temperature of the battery, the intention being to create an advantageous design in overall terms.

This object is achieved according to the invention in which waste air from the high-temperature battery is conveyed in a controllable manner to a first heat exchanger, which can also be controllably bombarded with fresh air. The first heat exchanger is arranged as part of a water or liquid circuit which has a further heat exchanger for the delivery of heat to air of the interior and is connected, downstream from this further heat exchanger (in the flow direction of the liquid), to heat generating components, e.g. voltage transformer or controller and electric motor, of the electric drive system, to absorb the waste heat from these components.

The invention is based upon the general concept of transferring the heat of the waste air from the high-temperature battery to a water or liquid circuit, so that the high-temperature battery may be reliably air cooled, while the heat of the battery, (in virtually any desired arrangement within the vehicle) is transferred to the interior without significant losses. These advantageous results can be achieved because the liquid flowing in the circuit, particularly water, is capable of transporting large quantities of heat, even with a low quantity of liquid since the, liquid conduits may be insulated with no great effort against heat loss.

The overall design remains desirably uncomplicated, since the liquid circuit, for its part, is also used for heat absorption and hence cooling of heat generating components of the electric drive system. This is readily possible, since the temperature of the liquid, given an appropriate design layout, remains relatively low even during heating operation at maximum power.

Where no heating is required, the liquid circuit can serve solely to cool the components of the electric drive system, since the first heat exchanger, where appropriate, can also be bombarded with fresh air to the extent necessary to evacuate the heat. Moreover, for this purpose, according to a preferred embodiment of the invention, the liquid circuit may be provided with a controllable by-pass duct which bypasses the further heat exchanger, so that the interior, where appropriate, is supplied with no heat whatsoever.

In addition, provision is expediently made to allow air to be led between the battery and the first heat exchanger wholly or partially under circulating-air operation, so that the waste heat from the battery, where appropriate, can be transferred fully into the liquid circuit.

Where appropriate, a further heat accumulator can be disposed in the liquid circuit to provide temporary storage for heat which is not required for heating purposes.

Other objects, advantages and novel features of the present invention will become apparent from the following detailed description of the invention when considered in conjunction with the accompanying drawings.

DETAILED DESCRIPTION OF THE DRAWINGS

Figure 1:
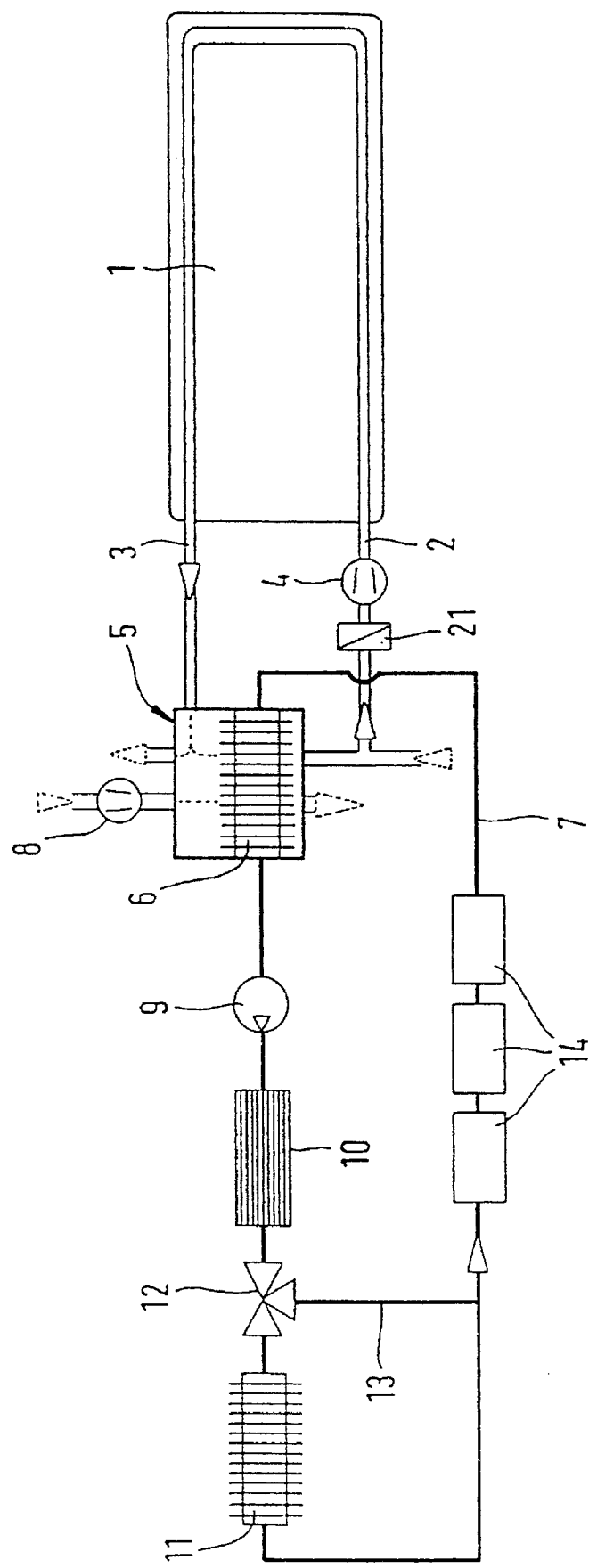
FIG. 1 is schematic representation of the heating system according to the invention.
Figure 2A:
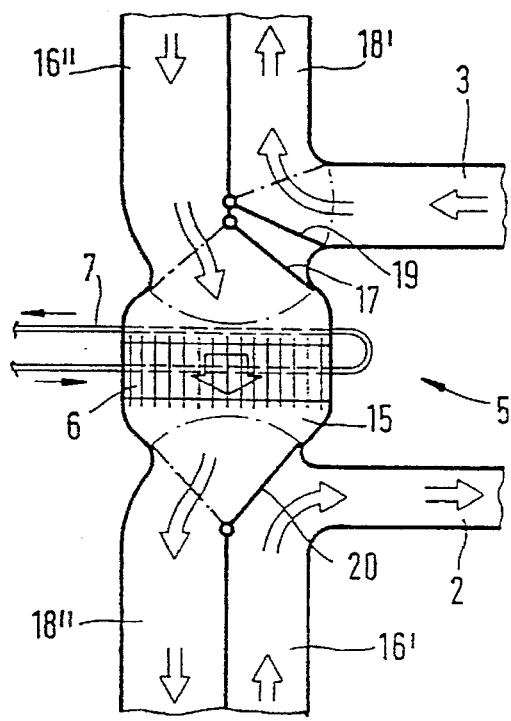
FIG. 2A–2D show an air-conducting and flap system for controlling the air flow in the battery and at the first heat exchanger in various operating modes.
Figure 2B:
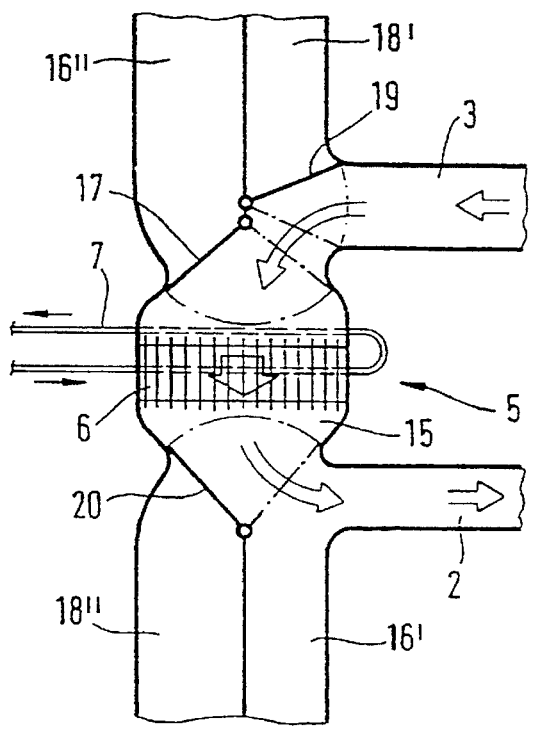
Figure 2C:
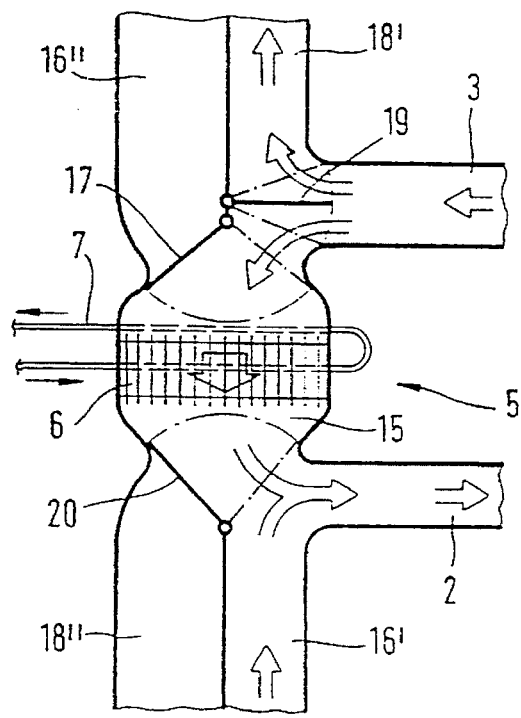
Figure 2D:
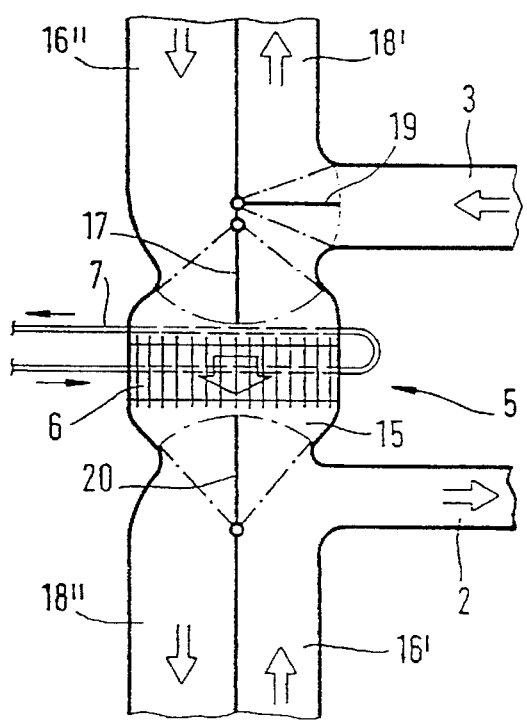

According to FIG. 1, a high-temperature battery 1 possesses an air intake 2 and an air outflow 3, so that, by means of a blower 4, cool air can be blown through the high-temperature battery 1.

By means of an air-control and flap system 5, (explained further below) the battery 1 is supplied with cool fresh air which, after having been heated in the battery 1, is blown away outwards. Alternatively, under circulating air operation the heated waste air from the battery 1 can be conveyed wholly or partially to the suction side of the blower 4 through a heat exchanger 6, which is arranged as part of a water circuit 7 and which (where appropriate) can be directly bombarded with cool fresh air by means of a further blower 8 (or indeed by convection).

The water circuit 7 possesses a circulating pump 9, behind which a heat accumulator 10 and a further heat exchanger 11 are disposed. A control valve 12 is provided between the heat accumulator 10 and the heat exchanger 11, in order, where appropriate, to conduct the water emanating from the circulating pump 9 into a bypass conduit 13 leading past the heat exchanger 11.

The heat exchanger 11 serves to deliver heat from the water to the air of a vehicle interior (or to the air supplied to the vehicle interior), in order, where appropriate, to heat the interior.

Heat-generating components 14 of the electric drive system are disposed upstream of the heat exchanger 6 in the flow direction of the water. In this manner, heat from these components can be evacuated by the water so that the water circuit 7 serves as a cooling circuit. Also, where appropriate, waste heat from these components 14 is also made available for heating purposes.

The air-control and flap system 5 possesses an air chamber 15 (FIGS. 2A–2D) which accommodates the heat exchanger 6 and two air inlets 16' and 16". The air inlet 16' is constantly connected to the air intake 2 of the high-temperature battery 1, while the air inlet 16", (which provides fresh air to the heat exchanger 6, where appropriate) can be shut off by a flap 17. Two air outlets 18' and 18" are provided, with flaps 19 and 20 by which waste air emanating from the air outflow 3 of the high-temperature battery 1, is blown via the air outlet 18' in the outward direction or is conduct wholly or partially to the heat exchanger 6. Alternatively flaps 19 and 20 can be set either to evacuate the air emanating from the heat exchanger 6 via the air outlet 18" in the outward direction or conduct it wholly or partially to the air intake 2 of the battery 1.

The flaps 17, 19 and 20 can be adjusted in various ways:

In Diagram A of FIG. 2, the flaps are adjusted so that the battery 1 is constantly supplied with fresh air, and the waste air emanating from the battery 1 is constantly evacuated outwards, whilst, at the same time, fresh air flows constantly through the heat exchanger 6 and is then conducted outwards. In this operating mode, the battery 1 is therefore constantly cooled, and the water circuit 7 serves solely to cool the components 14.

In Diagram B of FIG. 2, the flaps 17, 19 and 20 are adjusted such that, on the one hand, no fresh-air is supplied to the heat exchanger 6 and, on the other hand, all of the waste air from the high temperature battery 1 is returned to its air intake 2. The heat of the battery 1 is thus fully transferred to the heat exchanger 6, and hence into the water circuit 7, so that this heat can be fed wholly or partially into the heat accumulator 10 and/or supplied to the heat exchanger 11 for interior heating. At the same time, the water circuit 7 continues to cool the components 14, the waste heat from which serves to preheat the water on the intake side of the heat exchanger 6

In Diagram C of FIG. 2 part of waste air emanating from the battery 1, circulates through the heat exchanger 6, so that the battery 1, at the air intake 2, is also supplied with a corresponding proportion of fresh air.

Diagram D of FIG. 2 shows that the flaps 17, 19 and 20 may be set in fundamentally any desired intermediate positions, so that a corresponding combined operation is enabled. In this manner the heat exchanger 6 receives both waste air from the battery 1 and fresh air; the air flowing away from the heat exchanger 6 is wholly or partially evacuated outwards or is conducted to the air intake 2 of the battery 1.

Contrary to the represented embodiment, the air inlets 16' and 16", as well as the air outlets 18' and 18", can respectively be disposed directly next to each other on the same side of the air chamber 15 or indeed as parts of a single air inlet or single air outlet respectively.

In order to avoid accumulations of dirt, dust, pollen or the like in the battery 1 or in the airways, it is expedient to provide corresponding air filters at the air intakes of the device and/or at the air intake of the battery 1 or of the blower 4.

In the example shown in FIG. 1, an air filter 21 is disposed on the intake side of the blower 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for heating an interior of an electric vehicle having an air-cooled high-temperature battery, comprising:

a liquid circuit;

a first heat exchanger coupled in thermal communication with said liquid circuit;

means for controlling a flow of fresh air through said first heat exchanger and for controlling a flow of exhaust air from said battery through said first heat exchanger; and a second heat exchanger arranged in said liquid circuit for transferring heat to air in an interior of said electric vehicle;

said liquid circuit being coupled in thermal communication with heat generating components of an electric drive system of said electric vehicle to absorb waste heat therefrom, at a point downstream from said second heat exchanger relative to a flow direction of said liquid circuit.

2. Device according to claim 1 wherein the liquid circuit has a controllable by-pass duct which bypasses the second heat exchanger.

3. Device according to claim 1 wherein air can be led between the high-temperature battery and the first heat exchanger wholly or partially under circulating-air operation.

4. Device according to claim 2 wherein air can be led between the high-temperature battery and the first heat exchanger wholly or partially under circulating-air operation.

5. Device according to claim 1 wherein the liquid circuit, further comprises a heat accumulator upstream of the second heat exchanger.

6. Device according to claim 1 wherein the liquid circuit further comprises a heat accumulator in front of the heat generating components.

* * * * *